June 25, 1946.              T. NELSON                2,402,659
                          STUD FOR WELDING
                         Filed Feb. 20, 1943
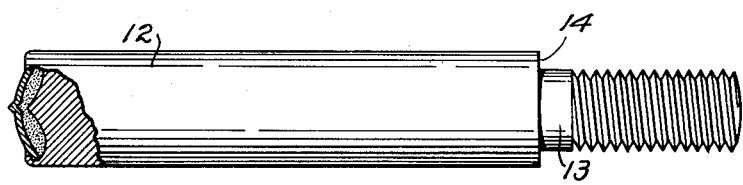
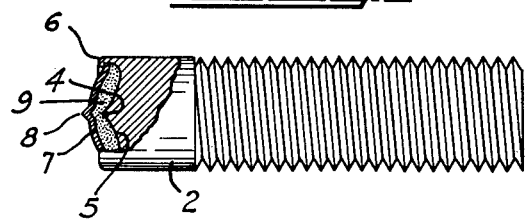
INVENTOR
  TED NELSON
BY Charles S. Evans
  HIS ATTORNEY Patented June 25, 1946

2,402,659

UNITED STATES PATENT OFFICE 2,402,659

STUD FOR WELDING

Ted Nelson, San Leandro, Calif.

Application February 20, 1943, Serial No. 476,518

3 Claims. (Cl. 287—20.2)

My invention relates to studs which are to be electrically welded to a plate or other member; and this application is a continuation-in-part of my copending application Serial No. 465,397, resulting in Patent No. 2,355,099, dated August 8, 1944. The said application was filed under my former name Edward F. Nelson.

One of the objects of my invention is the provision of an improved stud which lends itself to welding in any position.

Another object is the provision of a shoulder stud for welding to a plate and including improved means for insuring a sound weld.

My invention possesses other objects and features of advantage, some of which, with the foregoing, will be set forth in the following description of my invention. It is to be understood that I do not limit myself to the showing made by the said description, and the drawing, as I may adopt variant forms of my invention within the scope of the appended claims.

In the drawing which is on an enlarged scale,

Figure 1 is a side elevation of one form of the stud of my invention, a portion of the body being shown cut away to disclose the construction of the flux-loaded end.

Figure 2 is a side elevation of another form of my stud in which a shoulder is provided at the base of a threaded shaft extending from the body.

The joining of metal parts by fusing or welding them together has become one of the most if not the most important process in modern construction. Successful application of the welding procedure involves a number of critical factors, the control of which has been reached only as the culmination of long experiment and experience by many able minds.

In various types of steel construction, but especially in ship building, it is necessary to weld enormous numbers of studs to deckplates, beams and other structural members which may lie in any position or angle to the horizontal. Even with a small diameter stud, mere establishment of a fusing arc between it and the plate to which it is to be fixed, does not necessarily result in a good and strong weld, although the position of the stud, timing of the arc, and other matters with which my present invention is not concerned, are efficiently provided for.

The arc will inevitably take the path of least resistance; and in doing this may play all over the end of the stud, finally fixing on and perhaps overheating one spot on the edge while failing to heat sufficiently other portions, so that when the stud is plunged against the plate to merge the melted areas of metal, fusing or coalescing over the whole area of the stud end does not take place and the weld is imperfect.

It is therefore of first importance in the rapid production of sound welds of cylindrical studs to control the arc so that it heats evenly across the end of the stud, and concurrently over the area of the plate upon which the stud is to be set. This is best accomplished by forcing the arc to a central position so that heating extends evenly outwardly to the edge of the end surface. Where the studs are provided to hold down deck planks or for similar uses, the body-threaded or shoulderless stud shown in Figure 1 is usually preferred, since this form permits the nut to be tightened down firmly against the thing held. Where the studs are provided to hold conduit or pipe brackets spaced from the wall or sheets of insulation which might be injured or compressed by the nut, it is desirable to have a shoulder on the stud against which the bracket may be set firmly by the nut, or the insulation held securely under the nut without crushing.

In greater detail and referring first to Figure 1 my invention includes a stud 2, which is usually threaded as shown, and which may be of any length suitable to the purpose which it is to serve. The welding end of the stud is shaped substantially as shown in Figure 1, with a central conical point 4 and a surrounding recess or depression 5 ending at the peripheral flange 6, which is upset or spun inwardly over the edge of a thin metal shell or cap 7 to hold the latter securely in place. The cap is also provided with a centrally disposed point 8, which together with the inner point 4, lies substantially in the long axis of the stud. Prior to fixing the cap in place, the recess between the cap and end of the stud proper is filled with a flux 9 which comes into action to protect and facilitate the coalescing of the metal during the welding process. Any suitable flux may be utilized, but I prefer a mixture of iron and aluminum. A similar flux has long been used loose about the area of the weld, but obviously it could not be applied overhead or on steeply sloping surfaces and even when the surface was flat and facing up, the powder was easily blown away or otherwise disturbed so that defective welds and failures were frequent. My stud loaded with the exact quantity of flux needed for the weld may be used in any position and the flux is protected and preserved up to the moment when its function is performed.

The inner and outer points also play an important part in the formation and control of the welding arc, since the current establishes itself between the surface to which the stud is to be affixed and the nearest point on the stud. The beginning of the current flow is through the outer point 8. With the almost immediate breakdown of the cap and the melting of the flux, the current flow jumps to the inner point 4. While it cannot be said that the welding current continues to pass exclusively through this central section, it is true that the points first direct and then tend to stabilize the main current flow through the central area of the stud end, so that the stud is evenly heated over its entire end; and correspondingly, the adjacent area of the plate 3 is evenly heated to receive the stud.

Another function of the pointed stud is that of permitting and facilitating the rapid and accurate positioning of the studs. When the stud is being welded through an aperture in a wooden plank, the ferrule may act as a bushing to center the stud in the hole, but on open work, the stud position may be indicated by a punch mark, so that a highly accurate lay-out may be effected. In such cases the welding machine is first placed so that the point 8 of the stud lies in the punch mark. This insures an accurate placing of the stud when the weld is completed.

With reference to Figure 2 this embodiment of my invention comprises a smooth body 12, the welding end of which is identical with the threaded stud explained in connection with Figure 1. The length of the smooth body is determined by the use to which the stud is to be put. Extending from the end of the body opposite the welding end is the short spindle or shank 13 threaded as indicated to receive a nut, which may or may not be used with a washer between it and the shoulder 14 depending on the circumstances of use. Sometimes such a stud is desired to hold a lining of insulation which would be compressed and injured by direct pressure of the holding devices. In such case the length of the body 12 is equal to the thickness of the insulating layer and a nut is threaded on the shank on top of a washer so that the insulation layer is held firmly without injury or crushing.

Such a stud as that illustrated in Figure 2 is also used where it is desired to suspend pipe or conduit or other fittings at a fixed distance from the wall or other supporting structure to which the stud is welded. In this case the bracket in which the pipe or conduit is supported, is bored to slip over the threaded shank and seat against the shoulder; and is held in that position by a nut turned down tight upon it.

I claim:

1. A stud having a recess in the end, a flux in the recess, a cap over the recess to confine the flux, and a point disposed centrally on the body of the stud under the cap.

2. A stud having a recess in the end, a flux in the recess, a cap over the recess to confine the flux, a point on the cap to facilitate placing the stud, and a point on the body of the stud aligned with the cap point.

3. In a stud having a recess in the end, a flux in the recess, a cap over the recess to confine the flux, the improvement which comprises a point centrally disposed on the cap to facilitate placing the stud.

TED NELSON.